United States Patent [19]

Hitomi

[11] Patent Number: 5,297,758
[45] Date of Patent: Mar. 29, 1994

[54] FISHING REEL WITH CLICK SOUND GENERATOR

[75] Inventor: Yasuhiro Hitomi, Sakai, Japan
[73] Assignee: Shimano Inc., Osaka, Japan
[21] Appl. No.: 635,650
[22] Filed: Dec. 28, 1990
[51] Int. Cl.⁵ .......................................... A01K 89/015
[52] U.S. Cl. ................................................. 242/307
[58] Field of Search ............... 242/306, 307, 308, 279, 242/280, 281

[56] References Cited

U.S. PATENT DOCUMENTS

| | | | |
|---|---|---|---|
| Re. 12,283 | 11/1904 | Meisselback et al. | 242/307 X |
| 746,544 | 12/1903 | Meisselback et al. | 242/307 X |
| 2,054,306 | 9/1936 | Stringer | 242/306 X |
| 2,229,470 | 1/1941 | Pezon | 242/307 X |
| 3,138,343 | 6/1964 | Henze | 242/308 |
| 4,477,038 | 10/1984 | Yorikane | 242/308 |
| 4,570,878 | 2/1986 | Nakajima | 242/307 X |

FOREIGN PATENT DOCUMENTS 1-30450 6/1989 Japan .
798025 7/1958 United Kingdom ................. 242/307

Primary Examiner—Katherine Matecki
Attorney, Agent, or Firm—Dickstein, Shapiro & Morin

[57] ABSTRACT

A fishing reel with a click sound generator. The reel includes a pair of side frames, a spool rotatably fitted on a support shaft extending between the side frames and a level wind mechanism disposed radially outside the spool and including a drive shaft extending in parallel with the drive shaft. The spool and the drive shaft are operatively connected with each other for co-rotation. The drive shaft mounts a clicking wheel, and the drive shaft and the clicking wheel are operatively connected with each other through a oneway clutch mechanism for unidirectionally allowing rotational force in a direction for delivering a fishing line from the spool.

6 Claims, 2 Drawing Sheets

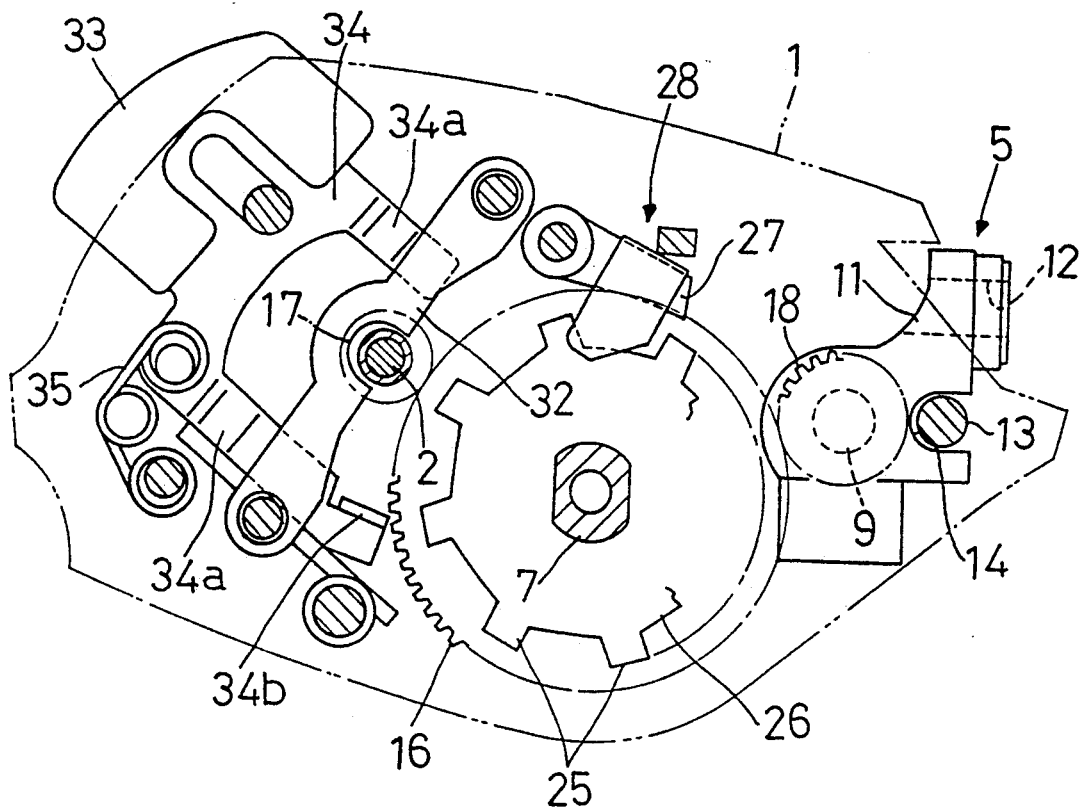
FIG. 2
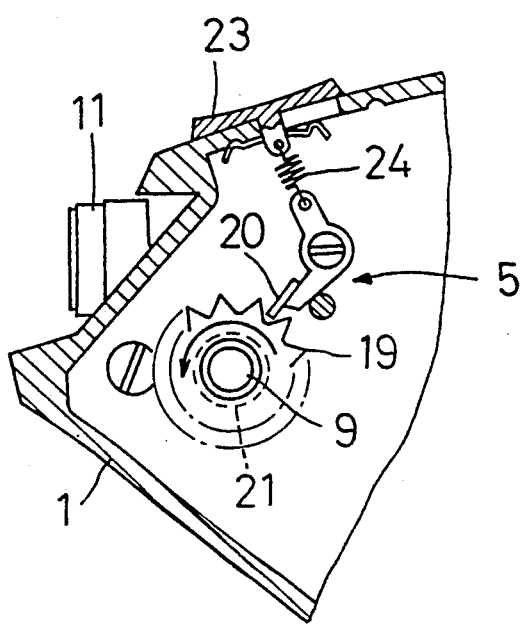
FIG. 3
FIG. 4

FISHING REEL WITH CLICK SOUND GENERATOR

BACKGROUND OF THE INVENTION

1. FIELD OF THE INVENTION

The present invention relates to a fishing reel with a click sound generator, and more particularly to a double-bearing type fishing reel with the above function including a spool rotatably supported on a support shaft held between a pair of side reel frames and a level wind mechanism having a drive shaft disposed in parallel with the support shaft. The level wind mechanism is used for uniform winding of a fishing line about the spool.

2. Description of the Related Art

A typical fishing reel of the above-noted type is known from e.g. Japanese published patent gazette No. 1-30450. This reel has a support shaft projecting from one side reel frame and used solely for supporting a clicking gear, a drive gear loosely fitted on the support shaft and constantly meshing with a spool drive gear fitted on a handle shaft and a oneway clutch mechanism interposed between the driven gear and the clicking gear.

The above conventional construction requires the support shaft dedicated for use in the click sound generator and the driven gear for sole use with the oneway clutch mechanism which mechanism is used for not generating clicking sound when a fishing line is wound about the spool. In short, the convention requires a considerable number of elements. Moreover, the click sound generator is disposed aside a spool drive gearing inside one side reel frame, which means that all these elements need to be arranged within the very limited space inside the side reel frame, thus making the assembly very troublesome.

Accordingly, the primary object of the present invention is to overcome the above problem of the convention by providing an improved fishing reel with a click sound generator which effectively utilizes the level wind mechanism.

SUMMARY OF THE INVENTION

For accomplishing the above-noted object, a fishing reel with a click sound generator, according to the present invention, comprises: a pair of side frames; a spool rotatably fitted on a support shaft extending between the side frames; a level wind mechanism disposed radially outside said spool and including a drive shaft extending in parallel with the drive shaft. The spool and the drive shaft are operatively connected with each other for co-rotation. The drive shaft mounts a clicking wheel. Further, the drive shaft and the clicking wheel are operatively connected with each other through a oneway clutch mechanism for unidirectionally allowing rotational force in a direction for delivering a fishing line from the spool.

Functions and effects of the above construction will now be described.

With catch of fish, the spool is rotated for delivering the fishing line therefrom. This spool rotation causes co-rotation of the drive shaft, and the clicking wheel fitted on this drive shaft is also rotated via the oneway clutch mechanism, thus generating a clicking sound for notifying the angler of the catch of fish. When the angler takes up the delivered line about the spool through reverse rotation of the drive shaft, the oneway clutch mechanism acts to prevent reverse rotation of the clicking wheel thus not generating the clicking sound.

As described above, according to the construction of the present invention, the clicking sound is generated only in the course of line delivering operation, not the line take-up operation. Further, the drive shaft of the level wind mechanism acts also as a support shaft for the clicking wheel, thus eliminating the further support shaft used solely for the click sound generator. The improved construction has also eliminated the drive gear used solely for the oneway clutch mechanism. Further, with this improvement, the clicking wheel can be disposed inside either of the side frames, whereby separate arrangement of the elements becomes possible for facilitating the assembly.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate one preferred embodiment of a fishing reel with a click sound generator according to the present invention; in which,
FIG. 2 is a side view of the fishing reel,
FIG. 3 is a side view of the click sound generator,
and
FIG. 4 is an exploded perspective view of essential portions.

DESCRIPTION OF THE PREFERRED EMBODIMENTS

Figure 1:
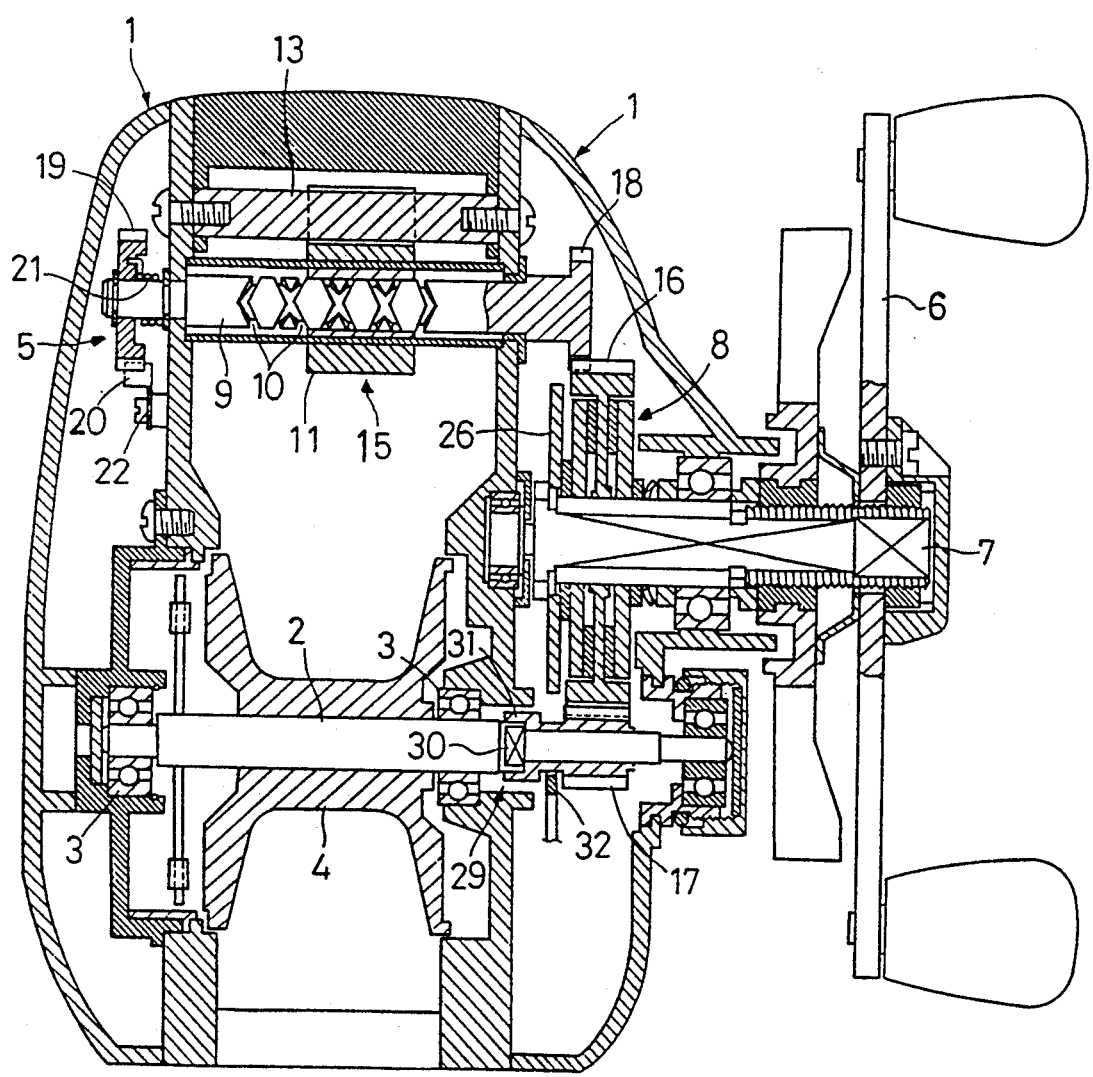
FIG. 1 is a section of the fishing reel.

Preferred embodiments of the invention will now be described in particular with reference to the accompanying drawings.

FIG. 1 shows a double-bearing type fishing reel relating to one preferred embodiment of the invention. This fishing reel includes a pair of right and left side frames 1, 1 and a support shaft 2 rotatably supported between the side frames 1, 1 via bearings 3. The support shaft 2 fixedly mounts a spool 4 for co-rotation. A level wind mechanism 15 for helping uniform winding of a fishing line about the spool 4 is disposed radially outside the spool 4. The one side frame 1 supports a handle shaft 7 rotatable in unison with a handle bar 6, with the shaft 7 being in parallel with the spool shaft 2. As surrounded by the handle shaft 7, the spool support shaft 2 and the level wind mechanism 15, there is interposed a multi friction plate type drag mechanism 8 for power transmission through adjustable frictional resistance.

An anti-reverse mechanism 28 is provided for allowing unidirectional, i.e. only forward rotation of the handle shaft 7 for the spool 4 to take up the fishing line. More particularly, as shown also in FIG. 2, this anti-reverse mechanism 28 includes a rotary member 26 rotatable with the handle shaft 7 and having a stopper projection 25 and a ratchet claw 27 fitted on an outer periphery of the rotary member 26 and engageable with the stopper projection 25 during a reverse rotation.

In the level wind mechanism 15, a drive shaft 9 is rotatably supported as extending between the side frames 1, 1 and in parallel with the spool support shaft 2. This drive shaft 9 defines, in its outer periphery, a reciprocating spiral groove 10 by a predetermined pitch, and the shaft 9 slidably mounts a driven member 11 having a projection engageable with the spiral groove 10. The driven member 11 defines a line inserting hole 12 and a recess 14 engageable with a rod 13 disposed in parallel with the drive shaft 9, such that the driven member 11 effects a reciprocating motion along the spiral groove 10 while rotation of the member 11 is restricted through the engagement between the rod 13 and the recess 14. The spool 4 and the drive shaft 9 are operatively connected with each other for rotation in unison. At an axial outside position of the drive shaft 9, there is provided a click sound generator 5 for generating a clicking sound in association with the line-delivering rotation of the spool 4. More particularly, a drive gear 16 formed continuously with a driven friction plate of the drag mechanism 8 meshes with a driven spool gear 17 fixedly mounted on the spool support shaft 2 and with a gear portion 18 formed at one side end of the drive shaft 9. In operation, during a line take-up operation, as the handle bar 6 is rotated, the spool 4 and the drive shaft 9 are driven to rotate for uniformly taking up the line about the spool 4. On the other hand, when the line is delivered with catch of fish, the spool 4 and the drive shaft 9 are reversely rotated against the resistance of the drag mechanism 8.

The click sound generator 5 includes a clicking gear 19 as one example of a clicking wheel and a stopper element 20 elastically engageable with and disengageable from a jagged portion defined peripherally of the clicking gear 19. This clicking gear 19 is fitted on a distal end of the drive shaft 9 opposite to the gear portion 18. Further, as shown in FIG. 4, the drive shaft 9 and the clicking gear 19 are operatively connected with each other through a oneway spring 21 as one example of a oneway clutch mechanism for allowing unidirectional rotation of the spool 4 for the line takeup direction. This oneway spring 21, when the drive shaft 9 is rotated for delivering the line, elastically and tightly winds about the drive shaft 9 to be rotated therewith for rotating the clicking gear 19. During a reverse rotation of the spool, as this reverse direction is opposite to the direction of the turn of the spring 21, the spring 21 expands radially and rotates freely about the drive shaft 9. As shown in FIG. 3, the stopper element 20 is pivotably supported to a support pin 22 extending from the side frame 1. Between this stopper element 20 and a slidable support element 23 slidable relative to the side frame 1, there is interposed a coil spring 24 for allowing a receding movement. Accordingly, the above construction switchably establishes two conditions between the stopper element 20 and the clicking gear 19, i.e. the engaged condition for generating a clicking sound and the disengaged condition for generating no clicking sound.

With the above-described entire construction, the drive shaft 9 of the level wind mechanism 15 acts also as a drive shaft for the clicking gear 19. Further, the click sound generator 5 is disposed on the distal end of the drive shaft 9 adjacent the side frame 1 distantly opposite to the other distal end of the shaft 9 adjacent the drive mechanism of the spool 4. Accordingly, the construction of this embodiment is simple and easy to be assembled.

Incidentally, as shown in FIG. 1, between the spool driven gear 17 and the spool support shaft 2, there is interposed a clutch mechanism 29 for engaging and disengaging power transmission between the gear 17 and the shaft 2. More specifically, the spool support shaft 2 has an angular stepped engaging portion 30; whereas, the driven spool gear 17 has, at a side position thereof, an angular hole 31 corresponding to the engaging portion 30. For selective clutching and declutching actions, there is provided a shifter member 32. Then, through functions of this shifter member 32 and the driven gear 17, the power transmission engaged condition is established as the angular hole 31 comes into engagement for co-rotation with the stepped engaging portion 30 and the transmission disengaged condition is established as the above engagement is released for allowing relative rotation. Referring more particularly to the shifting action of the shifter member 32, as shown in FIG. 2, the action is effected as a cam element 34 slidable in association with a push-in operation of a control member 33 comes into abutment against a cam face 34a. This cam face 34a is switchable between two positions by means of an urging force of a toggle spring 35, and in the transmission disengaged condition, an end portion 34b of the cam member 34 comes into abutment against the stopper projection 25 of the rotary member 26. Then, as the handle shaft 7 is rotated for taking up the line, the end portion 34b of the cam element 34 is pushed by the stopper projection 25 for automatically setting the cam element 34 at its transmission engaged position. In the transmission disengaged condition, the spool 4 is freely rotatable and therefore no clicking sound is generated with the delivery of the fishing line.

In place of the spring-using type described above, the oneway clutch mechanism can be of any other type such as a claw engaging type and a roller bearing type.

In the above embodiment, the spool 4 is fixedly fitted on the spool support shaft 2 for co-rotation. Instead, it is also conceivable to loosely fit the spool 4 on a support shaft while connecting this drive shaft with a gear connected with the spool 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A baitcasting fishing reel with a click sound generator, the reel comprising:
   a pair of side frames;
   a spool rotatably fitted on a support shaft extending between the side frames;
   a level wind mechanism disposed radially outside said spool and including a drive shaft, said drive shaft being parallel to said support shaft, said drive shaft having an end portion;
   means for simultaneously rotating said spool and said drive shaft;
   a click sound generator including a clicking wheel and a stopper element, said clicking wheel having a jagged portion on an outer periphery thereof, said stopper element being engageable with said jagged portion of said clicking wheel, said clicking wheel being mounted on said end portion of said drive shaft;
   a one-way clutch mechanism for allowing rotational force to be transmitted from said drive shaft to said clicking wheel only in a direction for unwinding a fishing line from said spool, said drive shaft and said clicking wheel being connected to each other through said one-way clutch mechanism, said drive shaft functioning both as a drive shaft for said level wind mechanism and as a support shaft for said clicking wheel; and wherein said one-way clutch mechanism is arranged such that said clicking wheel rotates to generate a clicking sound when said drive shaft rotates in a spool line unwinding direction, and such that said clicking wheel is not rotated and a clicking sound is not generated when said drive shaft rotates in a spool line winding direction.

2. A fishing reel as defined in claim 1, wherein said oneway clutch mechanism is a oneway spring.

3. A fishing reel as defined in claim 2, wherein said clicking wheel is a clicking gear, said stopper element being elastically engageable with and disengageable from said jagged portion.

4. A fishing reel as defined in claim 3, further comprising a support element slidable relative to one of said side frames, and a support pin extending from said one of said side frames, and wherein said stopper element is pivotably supported to said support pin, said reel further comprising an elastic coil spring having first and second ends, said first end of said coil spring being connected to said stopper element, and said second end of said coil spring being connected to said support element, thus switchably establishing a clicking position through engagement between said stopper element and said clicking gear and a non-clicking position through disengagement between the same.

5. A fishing reel as defined in claim 1, wherein said clicking wheel is a clicking gear, said stopper element being elastically engageable with and disengageable from said jagged portion.

6. A fishing reel as defined in claim 5, further comprising a support element slidable relative to one of said side frames, and a support pin extending from said one of said side frames, and wherein said stopper element is pivotably supported to said support pin, said reel further comprising an elastic coil spring having first and second ends, said first end of said coil spring being connected to said stopper element, and said second end of said coil spring being connected to said support element, thus switchably establishing a clicking position through engagement between said stopper element and said clicking gear and a non-clicking position through disengagement between the same.

* * * * *